(12) United States Patent
Tsuyuki

(10) Patent No.: US 7,170,653 B2
(45) Date of Patent: Jan. 30, 2007

(54) FIXING STRUCTURE FOR SOLID STATE IMAGE FORMING DEVICE, IMAGE DATA INPUT UNIT AND IMAGE DATA INPUT APPARATUS INCLUDING THE SAME

(75) Inventor: Tatsuya Tsuyuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 740 days.

(21) Appl. No.: 09/888,599

(22) Filed: Jun. 26, 2001

(65) Prior Publication Data

US 2002/0018251 A1 Feb. 14, 2002

(30) Foreign Application Priority Data

Jun. 27, 2000 (JP) ............................. 2000-192006

(51) Int. Cl.
*H04N 1/04* (2006.01)
(52) U.S. Cl. ...................... 358/483; 358/474; 250/239; 348/294; 257/215
(58) Field of Classification Search ................ 358/482, 358/483, 474; 165/121; 258/215; 250/239; 348/294
See application file for complete search history.

(56) References Cited

U.S. PATENT DOCUMENTS 4,318,135 A * 3/1982 Allis et al. .................. 358/474
4,581,657 A * 4/1986 Takano ........................ 358/483
5,358,165 A 10/1994 Andoh
6,439,299 B1 * 8/2002 Miyahara et al. ............ 165/121
6,472,247 B1 * 10/2002 Andoh et al. .................. 438/64

* cited by examiner

*Primary Examiner*—Thomas D Lee
*Assistant Examiner*—Heather D Gibbs
(74) *Attorney, Agent, or Firm*—Oblon, Spivak, McClelland, Maier & Neustadt, P.C.

(57) ABSTRACT

The present invention is made to provide a fixing structure for solid state image forming device made inexpensively and easily by simple caulking adhering method with keeping high positional accuracy, by which it is achieved that the solid state image forming device can be separated easily from the image focusing lens holding member when the image focusing lens holding member has a defect. In the fixing structure of present invention, an image focusing lens holding member 3 and an intermediate holding member 6 are adhered by caulking adhering method. Because one or more projecting portion 3*c* for painting adhesive material formed on the image focusing lens holding member 3, have smaller area than that of bottom surface 6*a* of the intermediate holding member 6, a space 10 is formed between the image focusing lens holding member 3 and the intermediate holding member 6, the solid state image forming device 1 fixed on the intermediate holding member 6 can be easily separated from the image focusing lens holding member 3 by inserting and turning a tool 11 whose width of top portion is smaller than the width of space 10.

15 Claims, 11 Drawing Sheets

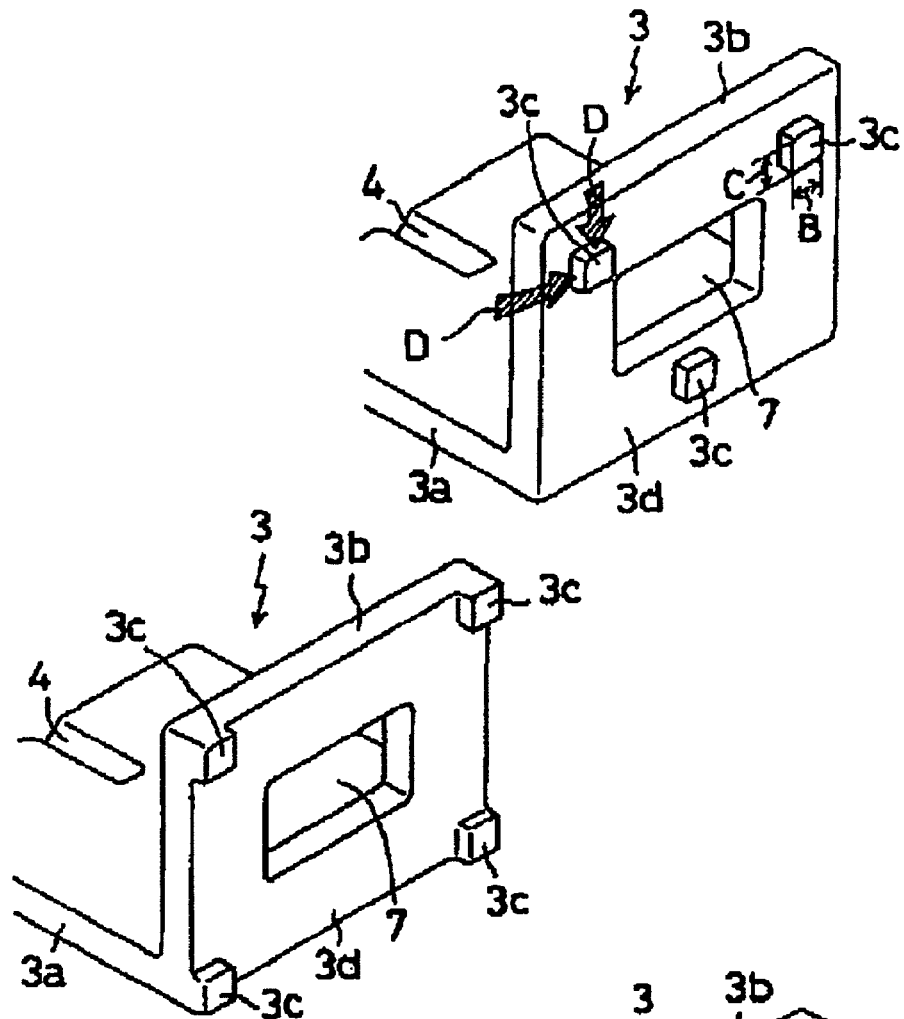
Fig. 2(a)
Fig. 2(b)
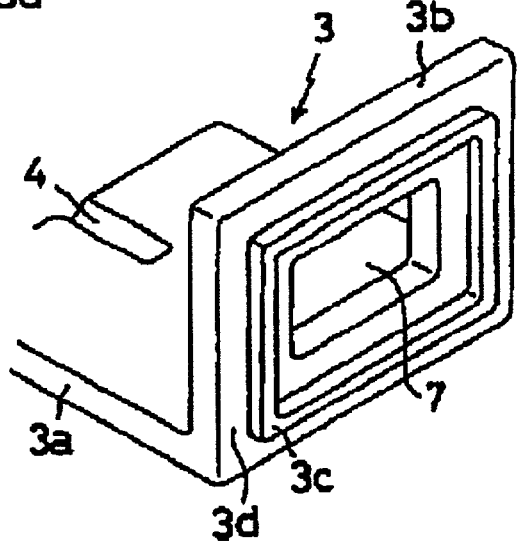
Fig. 2(c)

Fig. 5(a)
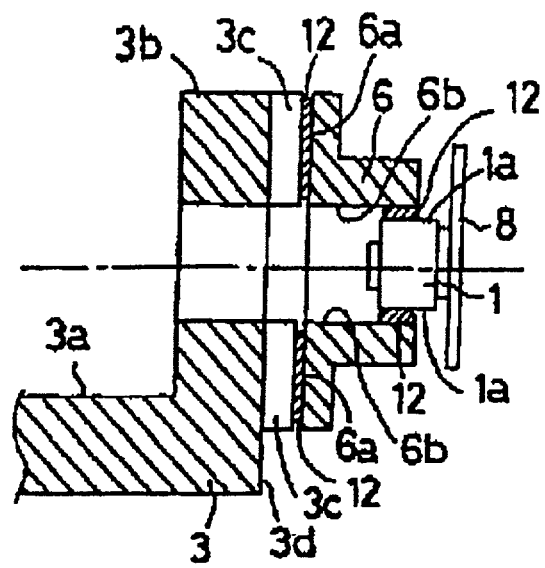
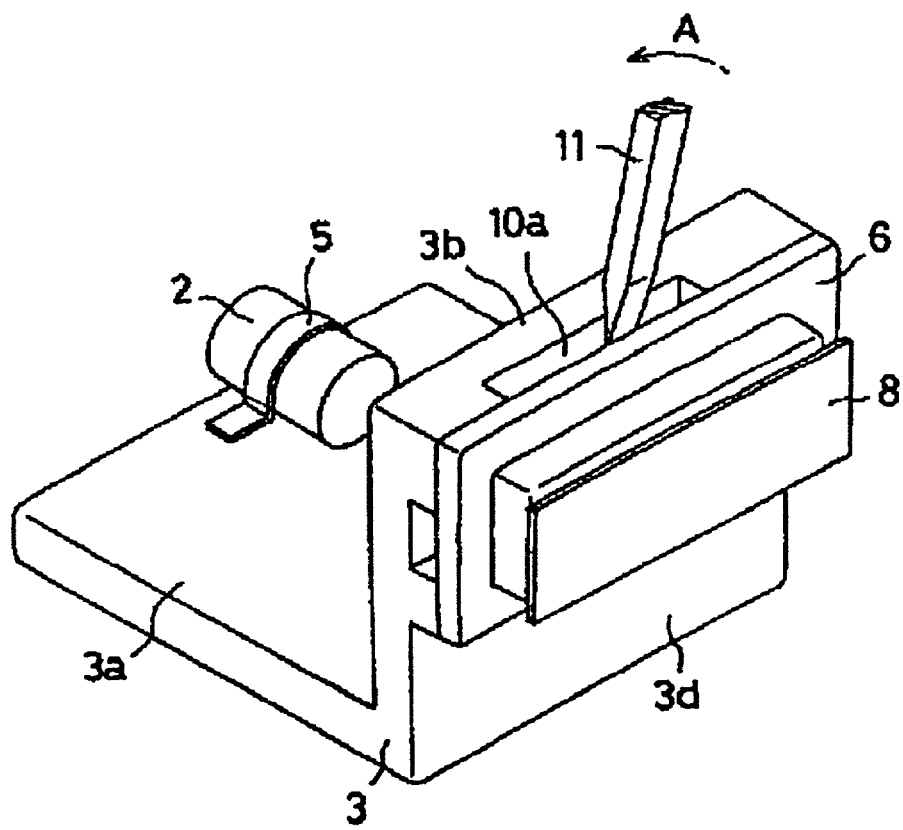
Fig. 5(b)

FIXING STRUCTURE FOR SOLID STATE IMAGE FORMING DEVICE, IMAGE DATA INPUT UNIT AND IMAGE DATA INPUT APPARATUS INCLUDING THE SAME

FIELD OF THE INVENTION

The present invention relates to a fixing structure for solid state image forming device, an image data input unit, and an image data input apparatus, such as copying machine, image scanner and facsimile, in which the image data input unit is included.

BACKGROUND OF THE INVENTION

In the image data input apparatus such as copying machine, image scanner, facsimile and so on, a solid state image forming device, such as so called CCD, is used. In this solid state image forming device 101, many photoelectric transforming device 102 having a dimension of some micro meters square, are arranged in line as shown in FIG. 8(a), and the image data input apparatus is arranged to achieve the image data input in that image of document 103 is focused by an image focusing lens 104 as shown in FIG. 9. Further, recently a solid state image forming device for colored image that has 3 peaks of spectroscopic sensitivity in R, G, B respectively to input colored image as shown in FIG. 8(b). This photoelectric transforming device is a device to transform optical energy to electrical energy, and in many times it is called as "pixel" when it is used for light receiving portion of the solid state image forming device such as CCD, hereinafter in this specification the photoelectric transforming device 102 is referred to as pixel 102.

In an image data input apparatus utilizing the solid state image forming device 101, the positional accuracy of line of pixels becomes very important because there is an importance that a line image from an image focusing lens 104 is focused on the pixels of the solid state image forming device 101 while the predetermined accuracy in the optical characteristics are fulfilled in order to realize better image input performance. To attain this, the position of the solid state image forming device 101 with regard to the image focusing lens 104 must be adjusted with a slight movement in five axes of x, y, z, β and γ respectively as shown in FIG. 9. Generally, it is requested that the positional accuracy of the solid state image forming device 101 of this kind is highly accurate in the five axes.

However, even the positioning adjustment has been attained with high accuracy, discrepancy may be happened when the solid state image forming device 101 is fixed, it causes an increase in costs because of need for more positioning adjustment again or disposal of scrap of the unit. Up to now the fixing is mainly achieved by screws, however, the amount of discrepancy is large such as ranged between some tens micro meters and some hundreds micro meters, sufficient precision of positioning could not be secured. For that reason, a fixing structure for solid state image forming device 101 to be attached without happening of discrepancy is long desired.

For example, in the Japanese Patent Laid Open No. Hei 5-328017 an arrangement in order to attain accurate positioning adjustment and fixing between CCD line sensor and image focusing lens utilizing a positional adjustment mechanism using wedge screw, ball and compressed spring, is disclosed. However, by this arrangement, because many complicated mechanism and parts are required and total number of parts is increased, it causes the increase of costs.

Accordingly, at present a fixing by adhesive material is mainly tried which is thought that amount of discrepancy is much less than that by screws and that the number of parts does not almost increase. When the fixing by adhesive material is classified roughly, one is a contacting adhering method in which the objects to be fixed together is contacting each other and adhered, and another is a caulking adhering method in which a space is made between the objects to be fixed together and the adhesive material is filled between the space to adhere, is not contacting with space.

As a technology utilizing this caulking adhering method, there is one which is disclosed, for example, in Japanese Patent Laid Open No. Hei 7-297993. According to the patent, an arrangement is disclosed in order to attach a holding member for solid state image forming device and a fixing member for solid state image forming device together with high accuracy on which an image focusing lens is fixed. That is to say, a projecting portion is arranged on the fixing member for solid state image forming device, and a hole portion with much larger diameter than the projecting portion is arranged on the holding member for solid state image forming device, then the above stated two members are placed each other in predetermined positional relation while the projecting portion is inserted into the hole portion, and they are fixed by the adhesive material which is filled the space at the inserted portion in a state with keeping their positional relation. In this arrangement the amount of space is settled so that the objects to be fixed are not contacting each other even when the shape and size of the objects to be fixed are different by scattering within the tolerance.

When ultraviolet setting type material is utilized as adhesive material, after it is painted on adhering surface of the object to be adhered 105, the object is adjusted the positional relation to the object to be adhered 107, then the adhesive material 106 is hardened to fix the object to be adhered 105 onto the object to be adhered 107 by irradiating ultraviolet to the ultraviolet setting adhesive material 106 through a light guide 108 from a space between the objects to be adhered 105 and 107 as shown in FIG. 10.

However, in the method disclosed in the Japanese Patent Laid Open No. Hei 7-297993, because the amount of space between the inserted portion is settled so that the projecting portion and the hole portion would not contact each other, and the adhesive material is filled the space to fix, it has problems listed below. Hereinafter the problems of this caulking adhering method are concretely explained with reference to FIG. 11.

In FIG. 11, the reference numerals 105' and 107' designate objects to be adhered, 106' designates the adhesive material. The object to be adhered 105' is fixed onto the object to be adhered 107' by a manner that the adhesive material 106' is filled in the space between the objects to be adhered 105' and 107', and hardened after the objects to be adhered have adjusted their positional relation on the predetermined position. The objects to be adhered 105' and 107' correspond to the outer surface of projecting portion and the inner surface of hole portion in the specification of Japanese Patent Laid Open No. Hei 7-297993. Herein, a predetermined space B must be prepared after the positional adjustment in order to keep space between 105' and 107' without contacting each other and to get required adhesive force by filling required amount of the adhesive material. When supposing an amount of dispersion in positional discrepancy of the adhering surface 105a of the object to be fixed 105' which includes space for positional adjustment, is A, and an amount of dispersion in positional discrepancy of the adhering surface 107a of the object to be fixed 107' which includes space for positional adjustment, is C, then film thickness of the adhesive material 106' becomes a range from B at the minimum and to A+B+C at the maximum, and it becomes dispersing in a range A+C. Further, when the objects to be fixed 105' and 107' have the dispersion I and J from the surface accuracy at the adhering surfaces, the film thickness of adhesive material 106' tends to have more dispersion in that amount.

Generally, as the adhesive material shrinks when it is hardened, it becomes required that the painting amount of adhesive material must be reduced as little as possible in order not for the objects to be fixed to have the positional discrepancy after the adhesive material is hardened. On the contrary, as the film thickness of adhesive material can not be made less than B in the above described caulking adhering method, it was impossible that the amount of positional discrepancy is made to remain within the tolerance after fixing.

In addition, the amount of shrinkage of the adhesive material after hardened, varies in accordance with the dispersion because the dispersion of film thickness of the adhesive material occurs up to A+C+I+J in total. In the result of this, when the position of objects to be fixed 105' and 107' after fixed, are dispersed more, there was a case in that the positional discrepancy became much larger.

Commonly, the volume shrinkage rate of ultraviolet setting adhesive material is in a level of range from 5 to 10 percent. When considering a case that the volume shrinkage rate is 6%, it shrinks about 2% in each respective three directions. Presuming the minimum space B is 0.5 mm, it shrinks in its direction about 10 $\mu$m by the shrinkage of adhesive material alter hardened. And presuming the total sum A+C+I+J of dispersion film thickness is also 0.5 mm, the shrinkage of about 10 $\mu$m occurs again by it, the positional discrepancy up to 20 $\mu$m at the maximum occurs.

To solve this kind of problems, there is a fixing structure disclosed in, for example, Japanese Patent Laid Open No. Hei 10-309801, that absorbing the positional discrepancy by a shrinkage of the adhesive material and increasing the positional accuracy of the fixed objects by means of an intermediate holding member lying between the objects to be fixed when they are fixed by the caulking adhering method.

This fixing structure is characterized in that an intermediate holding member is lying between the inkjet head and the head holding member, then the intermediate holding member is fixed onto an inkjet head by the adhesive material and at the same time it is fixed onto the head holding member through the adhesive material in order to attach an inkjet head onto a head holding member with high accuracy in a fixing structure for the inkjet head. According to this fixing structure, the positional discrepancy between the inkjet head and the head holding member can be made decreased when they are fixed because the shrinkage is absorbed by that the intermediate holding member moves so as to get closer to the inkjet head and to the head holding member in accordance with the shrinkage when the adhesive material is hardened and shrunk.

There has been proposed a fixing structure for solid state image forming device by which high accuracy of positioning can be attained with simple structure that an image focusing lens holding member and the solid state image forming device are fixed by means that the image focusing lens holding member and an intermediate holding member are adhered by the caulking adhering method and at the same time the intermediate holding member and the solid state image forming device are adhered by the caulking adhering method when the above stated fixing structure is applied to the fixing for solid state image forming device.

However, according to this fixing structure by adhesion, the high positional accuracy can be attained in low cost without necessity of complex mechanism, it is not easy to separate each parts again after fixing. To separate each parts, several method can be applicable that solvent is added to the adhered portion to melt the adhesive material, or a tool is inserted to separate the adhered portion mechanically, since, they are not good method to separate them because the former method takes so long time to melt and the latter method deforms or breaks the parts by the tool when the film thickness of the adhesive material is about some ten $\mu$m.

For example, there were cases that a digital copying machine is recalled from market because it has defect in the image focusing lens holding member itself and there are no defect in the solid state image forming device, the machine cannot help be scrapped with the solid state image forming device attached by the adhering method because there is no way to separate well the adhered portion. Not only for case that the products are recalled from market, but for case a fact has become clear after adhering that image focusing lens has defect, the machine also must be scrapped with the solid state image forming device.

It was a problem of cost increasing or yield of production decreasing and it is a problem from a view point of protection of environment which goes against the stream of the resource saving that parts without defect adhered to a parts with defect, is also scrapped with the defected parts. Especially, because the solid state image forming device and its circuit board attached to the solid state image forming device are expensive as the materials themselves, it was a serious problem to make them strapped though they don't have any defect.

The present invention has been made with regard to the above described problem, and it has an object to provide a fixing structure for solid state image forming device made inexpensively and easily by simple caulking adhering method with keeping high positional accuracy, by which it is achieved that the solid state image forming device can be separated easily from the image focusing lens holding member when the image focusing lens holding member has a defect, and only the image focusing lens holding member can be scrapped.

SUMMARY OF THE INVENTION

To solve the above described problem, according to the first aspect of this invention, a fixing structure for solid state image forming device comprising an intermediate holding member for holding the solid state image forming device onto an image focusing lens holding member by means of adhesive material, characterized in that: one or more contacting surfaces which face to contacting surface of said image focusing lens holding member, are arranged on said intermediate holding member; one or more projecting portions for painting said adhesive material are formed on at least one from a couple of said contacting surfaces it order to form a space for inserting a tool to separate said intermediate holding member and said image focusing lens holding member; and the projecting portion is used to be fixed through the adhesive material onto the contacting surface of other side of said couple of contacting surfaces, is provided.

Also to solve the above described problem, according to the second aspect of this invention, a fixing structure for solid state image forming device according to above aspect, characterized in that said image focusing lens holding member includes an image focusing lens holding board portion for holding the image focusing lens, and a standing board portion which in standing from the image focusing lens holding board portion and holds said solid state image forming device through said intermediate holding member, and in which a light beam passing window is formed to pass a light beam from said image focusing lens; said contacting surface which faces to the contacting surface of said intermediate holding member, is formed on said standing board portion, is provided.

According to the first and second aspect of the invention, because a fixing structure for solid state image forming device made inexpensively and easily by simple caulking adhering method with keeping high positional accuracy, by which it is achieved that the solid state image forming device can be separated easily from the image focusing lens holding member when the image focusing lens holding member has a defect, and only the image focusing lens holding member can be scrapped, is provided. It can be realized that the solid state image forming device and its circuit board need not to be scrapped and it causes a cost reduction in image data input unit, an increasing of yield of production, a resource saving and a contribution to protection of environment.

Also to solve the above described problem, according to the third aspect of this invention, a fixing structure for solid state image forming device according to the above second aspect, characterized in that at least three of said projecting portions for painting the adhesive material are arranged at the position that are apart in predetermined distances inside from the four corners of said contacting surface of said image focusing lens holding member, is provided.

According to the third aspect of the invention, because at least three of said projecting portions for painting the adhesive material are arranged at the position that are apart in predetermined distances inside from the four corners of said contacting surface of said image focusing lens holding member, in the fixing structure parts can be easily separated by contacting a tool onto the projecting portions for painting the adhesive material without fear of damage to parts, and more securely separation can be achieved.

Further, to solve the above described problem, according to the fourth aspect of this invention, a fixing structure for solid state image forming device according to any one of above described second or third aspect, characterized in that said space is arranged for the tool to be inserted so as to contact with said projecting portion for painting the adhesive material from vertical and horizontal direction, is provided.

According to the fourth aspect of the invention, because said space is arranged for the tool to be inserted so as to contact with said projecting portion for painting the adhesive material from vertical and horizontal direction, when the separation cannot be completed only in a first trial of achievement, it can be tried again with changing inserting direction or contacting position on the projecting portion of the tool, and it can be completed with better result.

Still further, to solve the above described problem, according to the fifth aspect of this invention, an image data input unit comprising an intermediate holding member for holding the solid state image forming device onto an image focusing lens holding member by means of adhesive material characterized in that: one or more contacting surfaces which face to contacting surface of said image focusing lens holding member, are arranged on said intermediate holding member; one or more projecting portions for painting said adhesive material are formed on at least one from a couple of said contacting surfaces in order to form a space for inserting a tool to separate said intermediate holding member and said image focusing lens holding member; and the projecting portion is used to be fixed through the adhesive material onto the contacting surface of other side of said couple of contacting surfaces, is provided.

According to the first aspect of the invention, because an image data input unit made inexpensively and easily by simple caulking adhering method with keeping high positional accuracy, by which it is achieved that the solid state image forming device can be separated easily from the image focusing lens holding member when the image focusing lens holding member has a defect, can be provided, a cost reduction in image data input unit, an increase of yield of production, a resource saving and a contribution to protection of environment can be attained.

Yet further, to solve the above described problem, according to the sixth aspect of this invention, an image data input apparatus including image data input unit comprising an intermediate holding member for holding the solid state image forming device onto an image focusing lens holding member by means of adhesive material, characterized in that: one or more contacting surfaces which face to contacting surface of said image focusing lens holding member, are arranged on said intermediate holding member; one or more projecting portions for painting said adhesive material are formed on at least one from a couple of said contacting surfaces in order to form a space for inserting a tool to separate said intermediate holding member and said image focusing lens holding member; and the projecting portion is used to be fixed through the adhesive material onto the contacting surface of other side of said couple of contacting surfaces image data input, is provided.

According to the sixth aspect of the invention, because an image data input apparatus having image data input unit made inexpensively and easily by simple caulking adhering method with keeping high positional accuracy, by which it is achieved that the solid state image forming device can be separated easily from the image focusing lens holding member when the image focusing lens holding member has a defect, can be provided, a cost reduction in image data input unit, an increase of yield of production, a resource saving and a contribution to protection of environment can be attained.

Hereinafter an embodiment of the fixing structure for solid state image forming device in accordance with the present invention, and an image forming unit utilizing the fixing structure, and an image data input apparatus utilizing the image data input unit will be described with reference to the drawings.

BRIEF DESCRIPTION OF THE DRAWINGS

FIG. 1s show an image data input unit including a fixing structure according to one aspect of the present invention.

FIG. 2s are perspective views of an image focusing lens utilized in the fixing structure for solid state image forming device according to the present invention, FIG. 2(a) shows one example of embodiment of the present invention, FIG. 2(b) shows a first variation of the example and FIG. 2(c) shows a second variation of the example.

FIG. 3s show an intermediate holding member according to one embodiment of the present invention.

FIG. 4s show a state of adhering the image data input unit shown in FIG. 1.

FIG. 5s show an image data input unit having a fixing structure according to a second variation of the example of present invention, FIG. 5(a) is a partial cross sectional view which is cut vertically along an optical axis of the image focusing lens, and FIG. 5(b) is a perspective view to show a state of separation by a separating means.

FIG. 8s are drawings to show a solid state image forming device.

DETAILED DESCRIPTION OF THE PREFERRED EMBODIMENTS

Hereinafter preferred embodiments of the fixing structure for solid state image forming device, an image forming unit and image data input apparatus utilizing the image data input unit according to the present invention will be described in detail with reference to the drawings.

Figure 12:
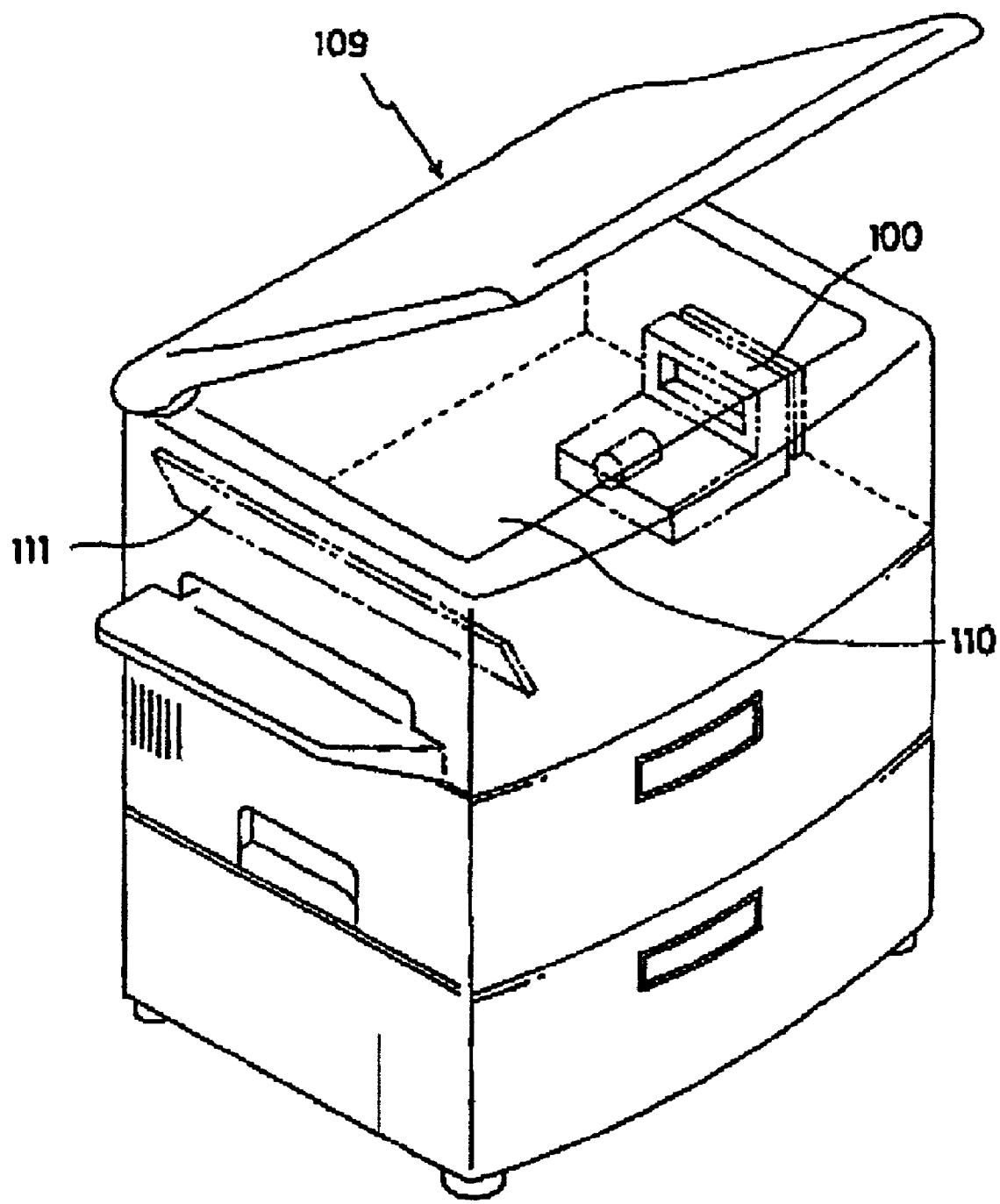
FIG. 12 is a rough sketch of perspective view of a digital copying machine as an image data input apparatus utilizing an image data input unit according to the present invention.

FIG. 12 is a rough sketch of perspective view of a digital copying machine 109 as an image data input apparatus having an image data input unit according to the present invention. To make copied document by this digital copying machine 109, firstly a document to be copied which is not shown in the drawing is set on a glass surface portion 110, and a start button is pushed down. By pushing down the start button, a light source which is not shown in the drawing illuminates the document to be copied. A reflecting mirror 111 reflects the light beam reflected by the document and directs it to an image data input unit 100 which is disposed in the digital copying machine. The light beam reflected by the document which is directed to the image data input unit 100, is focused on a solid state image forming device by an image focusing lens which is disposed in the solid state image data input unit 100 as described later in detail, and an image information is input. The same image as the document is copied on a recording paper based on the input image information by the image data input unit which is not shown in the drawing.

Figure 1A:
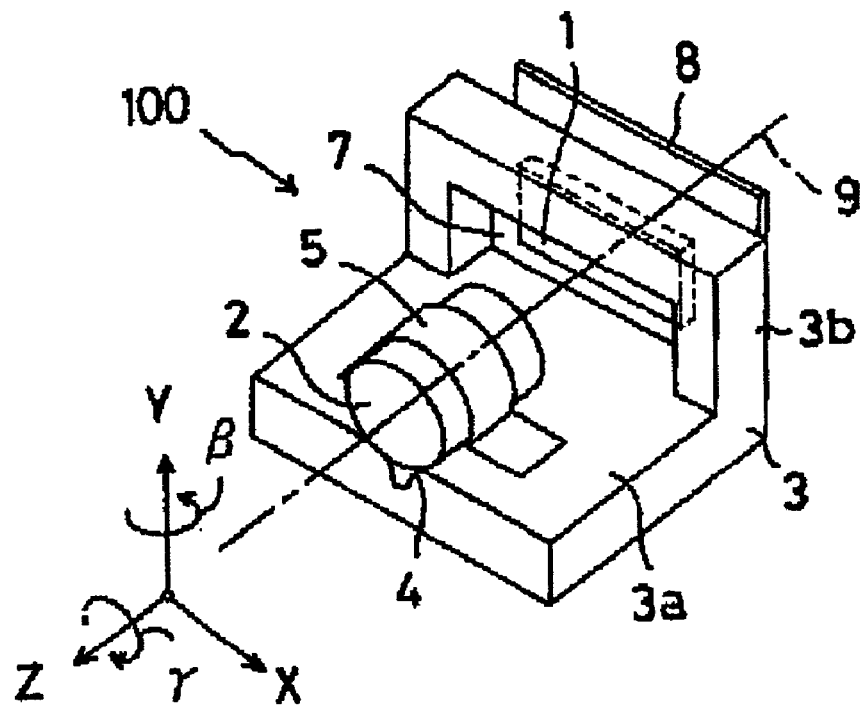
FIG. 1(a) is a rough sketch of perspective view and FIG. 1(b) is a side view looking from its right direction.
Figure 1B:
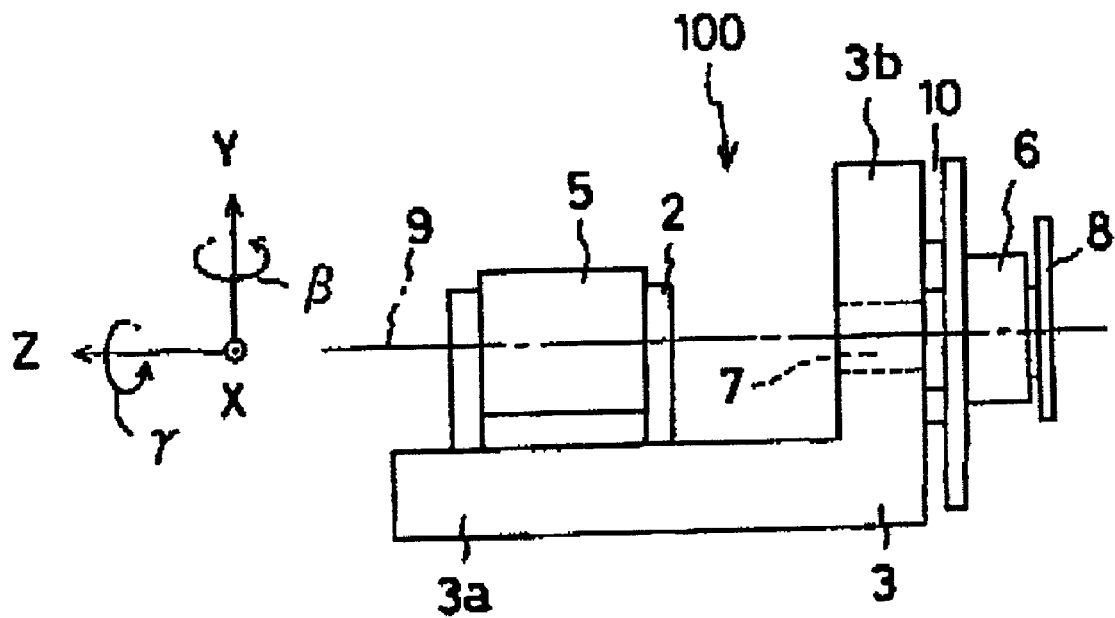

FIG. 1(a) is a rough sketch of perspective view of the image data input unit 100, and FIG. 1(b) is a side view of the image data input unit 100 looking from its right direction. The image data input unit 100 is utilized in an image scanning apparatus, and a facsimile other than the digital copying machine shown in FIG. 12. This image data input unit 100 has the fixing structure for solid state image forming device according to the present invention.

The image data input unit 100 mainly comprises a solid state image forming device 1, image focusing lens 2, an image focusing lens holding member 3 and an intermediate holding member 6, and the solid state image forming device 1 is implemented on a base board 8. On the base board 8, other than the solid state image forming device 1, a driving circuit for the solid state image forming device 1, a signal processing circuit for input signal which is input by the solid state image forming device 1 and so on are implemented, and it has a function to send the processed electric signal to other circuit which is electrically connected to the circuits on the base board. Further, photoelectric transforming devices as a light receiving devices to receive light signal from the image focusing lens 2 are arranged in line on the solid state image forming device 1, (hereinafter this photoelectric transforming device arranged in line is referred to as line of pixel) and the direction in which the line of pixel is extending, is perpendicular to the optical axis 9 and at the same time perpendicular to the surface of FIG. 1(b).

As shown in the drawing, the image focusing lens holding member 3 has a L shaped form in which a standing board portion 3b is standing from an image focusing lens holding board portion 3a, a V shaped ditch 4 is formed on the upper surface of the image focusing lens holding board portion 3a. A set of image focusing lens 2 is arranged and fixed by a lens holding board 5 after positional adjustment on the V shaped ditch 4 with its direction of the optical axis 9 being parallel to the direction in which the V shaped ditch 4 is extending. In the standing board portion 3b of the image focusing lens holding member 3, a light beam passing window 7 is formed and the light beam from the image focusing lens 2 passes through the light beam passing window 7 to be directed to the light receiving surface (image forming surface) of the solid state image forming device 1.

Herein, directions are defined as z axis is a direction which is parallel to the optical axis 9 of the image focusing lens 2, x axis is a direction which is a first scanning direction of the image data input apparatus, in other words, the line of pixel extending direction, and y axis is a direction which is a second scanning direction, in other words, the direction perpendicular to the x-z plane Also, a rotational direction around the y axis is defined as β direction and a rotational direction around the z axis is defined as γ direction.

As the rough sketch of perspective view is shown in FIG. 2(a), on a contacting surface 3d of the image focusing lens holding member 3, which faces to the intermediate holding member 6, three projecting portions 3c for painting adhesive material are formed, which are arranged in the position surrounding the light beam passing window 7 and predetermined distance inside from four corners of the contacting surface 3d.

Figure 3A:
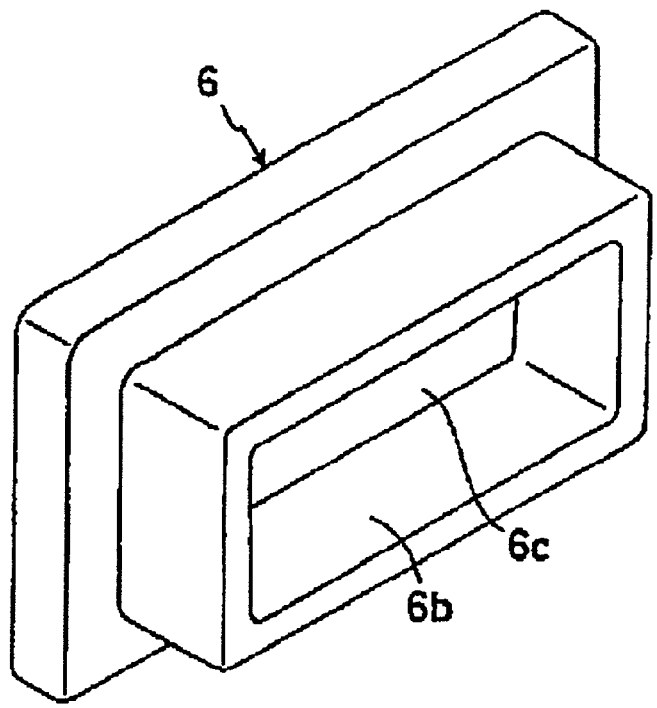
FIG. 3(a) is a rough sketch of perspective view looking from a direction in which the solid state image forming device is attached.
Figure 3B:
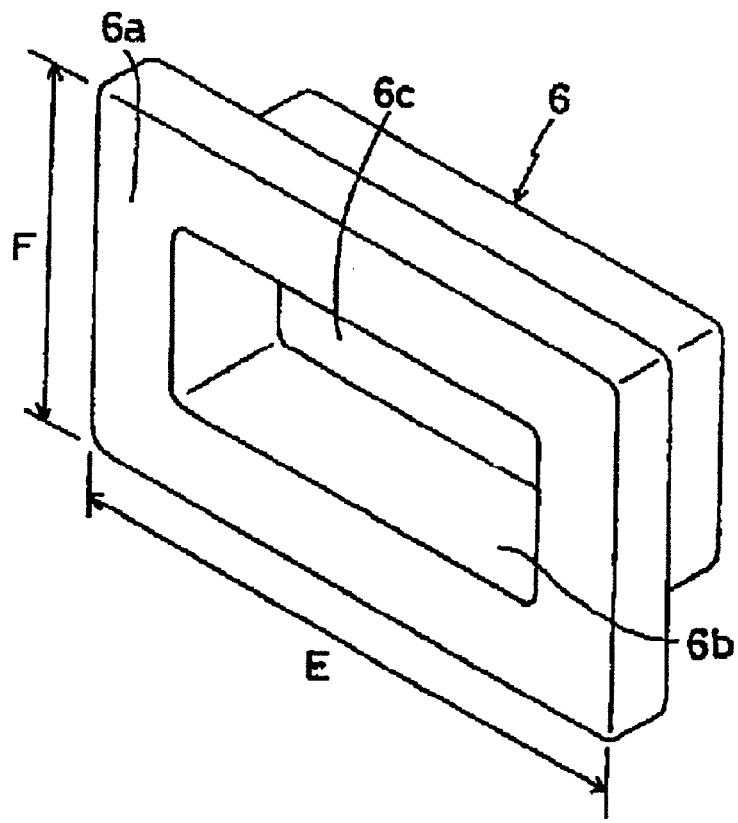
FIG. 3(b) is a rough sketch of perspective view looking from a direction in which the image focusing lens is attached.

The intermediate holding member 6 has a shape as shown in FIG. 3(a), 3(b), a light beam passing window 6c is formed in the center portion to direct a light beam from the image focusing lens 2 to the solid state image forming device 1. A bottom surface 6a of the intermediate holding member 6 as a contacting surface facing to the image focusing lens holding member 3, is adhered onto the standing board portion 3b of the image focusing lens holding member 3, and inner wall 6b of the light beam passing window 6c is fixed onto the solid state image forming device 1. The state of this adhering is depicted in FIG. 4(a).

Figure 4A:
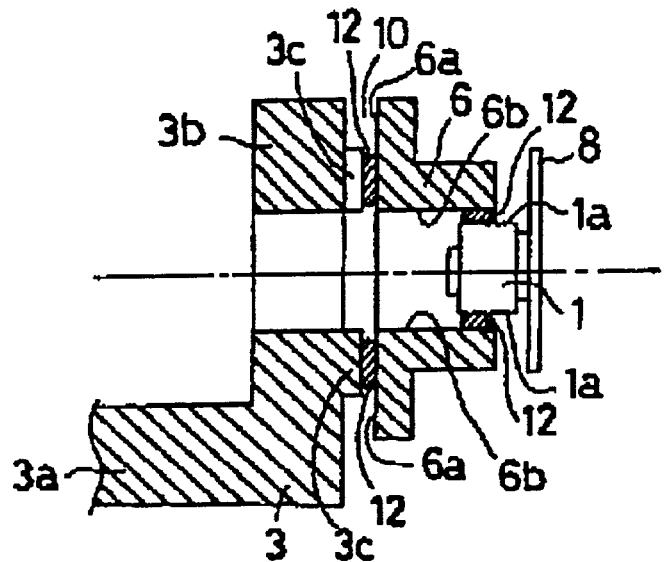
FIG. 4(a) is a partial cross sectional view which is cut vertically along an optical axis of the image focusing lens, looking from right direction.

FIG. 4(a) is a partial cross sectional view of the image data input unit 100 which is cut vertically along an optical axis and looking from right direction.

The bottom surface 6a of intermediate holding member 6 is adhered onto the projecting portions 3c for panting adhesive material which are formed on the standing board portion 3b of image focusing lens holding member 3 by caulking adhering method. An adhering surface 1a of the solid state image forming device 1 is adhered by the caulking adhering method onto the inner wall 6b of intermediate holding member 6. Herein, because an area of the projecting portions 3c for painting adhesive material of the image focusing lens holding member 3 (See the size B, C in FIG. 2(a)), is smaller than an area of the bottom surface 6a of the intermediate holding member 6 (See the size E, F in FIG. 3(b)), a space 10 is formed surrounding outside of the adhered portion as shown in the drawing.

This caulking adhering method is made after a positional adjustment between the image focusing lens holding member 3 and the solid state image forming device 1 in the five axes of x, y, z, β and γ, and hereinafter the process of it will be described.

Firstly, the solid state image forming device 1 and the image focusing lens holding member 3 are respectively fixed with a predetermined and adjusted positional relation on stages on which a fine positional adjustment in three dimension can be achieved. (Hereinafter, this stage is referred to as "fine adjustment stage".) On the fine adjustment stage onto which the solid state image forming device 1 is fixed, the fine adjustment in x, z and β as shown in FIG. 1 can be achieved, and on the fine adjustment stage onto which the image focusing lens holding member 3 is fixed, the fine adjustment in x, y and γ as shown in FIG. 1 can be achieved.

Secondly, adhesive material 12 of ultraviolet setting type is painted on the projecting portion 3c for adhesive material painting of the image focusing lens holding member 3 and the adhering surface 1a of solid state image forming device 1. An amount of shrinkage after hardening is the less when a painting amount of the adhesive material 12 of ultraviolet setting type, is the smaller, but the painting amount must be enough to fulfill a space between the adhering surfaces which are made after the fine positional adjustment in each axes direction has been completed as described later.

Thirdly, a bottom surface 6a of intermediate holding member 6 is forced to contact with the adhesive material 12 of ultraviolet setting type which is painted on the projecting portion 3c for adhesive material painting of the image focusing lens holding member 3, and then the inner wall 6b of intermediate holding member 6 is forced to contact with the adhesive material 12 of ultraviolet setting type which is painted on the adhering surface 1a of solid state image forming device 1.

Until the above described state, the ultraviolet ray is not irradiated onto the adhesive material 12. The adhesive material 12 of ultraviolet setting type is hardened in about ten seconds when the ultraviolet is begun to irradiate, however, because it is not hardened before the ultraviolet ray is irradiated, the fine positional adjustment can be achieved in this state between the solid state image forming device 1 and the image focusing lens holding member 3.

The adjustment of positional relation between the solid state image forming device 1 and the image focusing lens holding member 3 is achieved in a predetermined measuring method. There are several well known technology for the predetermined measuring method, for one example, a reference light beam irradiated from a reference light source, is gathered by the image focusing lens 2 in order to be focused on the line of pixel of the solid state image forming device 1, and a result of the image pattern by the solid state image forming device 1 to be measured, is compared to a reference image pattern (reference intensity pattern of receiving light) which had been obtained and memorized beforehand by the reference light beam when the positional relation was correct, however, the detail of it is not described here.

In this state, the adhering surface between the solid state image forming device 1 and the intermediate holding member 6 is substantially parallel to the x-z planes and the solid state image forming device 1 is restricted by the second adhering surface 6b of intermediate holding member 6 which is substantially parallel to x-z plane for moving in any direction other than x, z and β, and in these directions the fine positional adjustment can be achieved. Herein, the adhering surface between the image focusing lens 3 and the first adhering surface 6a of intermediate holding member 6 is substantially parallel to the x-y plane, and the image forming lens holding member 3 is restricted by the first adhering surface 6a of intermediate holding member 6 which is substantially parallel to x-y plane, for moving in any direction other than x, y and γ, and in these directions the fine positional adjustment can be achieved. In these consequence, the relative positional relation between the solid state image forming device 1 and the image focusing lens 3 can be easily and precisely adjusted through the intermediate holding member in the five direction of x, y, z, β and γ.

After completion of above described fine positional adjustment, a step for hardening of the adhesive material is achieved. This hardening of the adhesive material is attained by an irradiation of ultraviolet which is not shown in the drawing, onto the adhesive material of ultraviolet setting type, as it is completed in short period of time for about ten seconds, it brings higher yield of production.

At the step for hardening, the shrinkage of about 5 to 10 percent in volume shrinkage cannot help happening. However, in this embodiment of the present invention, the intermediate holding member 6 absorbs the shrinkage by a manner that the intermediate holding member 6 moves relative to the solid state image forming device 1 and the image focusing lens holding member 3 with progress of the shrinkage, the positional discrepancy between the solid state image forming device 1 and the image focusing lens holding member 3 itself is almost not happened.

After the completion of hardening of the adhesive material, the solid state image forming device 1 and the image focusing lens holding member 3 are put out from their file adjustment stages respectively. The image data input unit 100 in which the solid state image forming device 1 and the image focusing lens holding member 3 are adhered by the caulking adhering method through the intermediate holding member 6, ensures the precise positional relation with inexpensive and simple structure where positional discrepancy in not almost contained because the intermediate holding member 6 absorbs the shrinkage which happens at hardening step of the adhesive material.

Figure 4B:
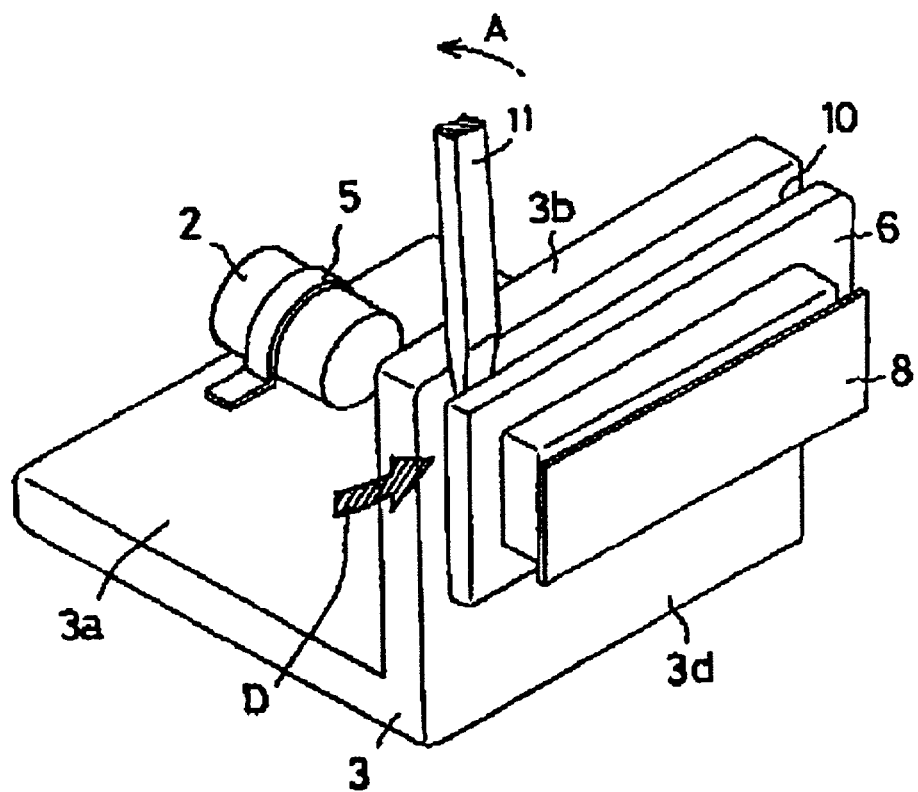
FIG. 4(b) is a perspective view to show a state of separation by a separating means.

Because an area of the projecting portion 3c for painting adhesive material of the image focusing lens holding member 3 is smaller than that of bottom surface 6a of the intermediate holding member 6, and the projecting portions 3c are arranged at the position that are apart in predetermined distances inside from the four corners of the contacting surface 3d, a space 10 is formed between the standing board portion 3*b* and the intermediate holding member 6 as shown in FIG. 4(*a*), 4(*b*). Into the space 10 between the standing board portion 3*b* and the intermediate holding member 6 by inserting a tool 11 as a separating means whose width of the top portion is narrower than that of space 10, and rotating in a direction A as shown in FIG. 4(*b*), the image focusing lens holding member 3 and the intermediate holding member 6 can be easily separated with principle of lever. When in a case that they have not been separated in a first trial, by another separating operation of inserting and turning the tool 11 from a different direction, for example, indicated by an arrow D as shown in FIG. 4(*b*), they can be easily separated.

By this arrangement, an image focusing lens holding member 3 with defect is easily separated and exchanged from the digital copying machine, in a case when, for example, it is recalled from market because the copying machine has defect originated not from the solid state image forming device 1 but only from the image focusing lens 3, and prevention of scrapping the solid state image forming device 1 without defect and the circuit board 8 onto which the solid state image forming device 1 is attached, is achieved, it can realize to attain a cost saving, a resource saving and a contribution for protection of environment.

VARIATION 1 OF EXAMPLE

A part of cross sectional view which is looked from its side direction, and a perspective view to explain a state of separation by a tool 11, are shown in FIGS. 5(*a*) and 5(*b*) for a first variation of the example of present invention, and a perspective view of the image focusing lens holding member 3 for it is shown in FIG. 2(*b*). In this variation 1, because the projecting portions 3*c* of the image focusing lens holding member 3 are formed on the corners of contacting surface 3*d*, and they are adhered onto the bottom surface 6*a* of the intermediate holding member 6, the space are not formed at the four corners of the contacting surface 3*d*, but spaces 10*a* are formed where the projecting portion for painting adhesive material are not formed in the circumference of contacting surface 3*d*, as shown in FIG. 5(*b*). By this arrangement the image focusing lens holding member 3 and the intermediate holding member 6 can be easily separated by means of inserting into this space 10*a* the tool 11 whose width of top portion is narrower than the width of space 10*a*, and turning it in a direction indicated by an arrow A.

VARIATION 2 OF EXAMPLE

In FIG. 2(*c*) an image focusing lens holding member 3 utilized in a fixing structure according to a second variation of the example of present invention is shown. In this variation 2, the projecting portion 3*c* for painting adhesive material of the image focusing lens holding member 3 is formed in the position surrounding the light beam passing window 7 without cut portion and predetermined distance inside from four corners of the contacting surface 3*b*. Because the other portions of embodiment are quite the same as the example of present invention, explanation is omitted. By this arrangement the tool 11 can surely get at the projecting portion 3*c* for painting adhesive material even when it is inserted at any portion from any direction, the image focusing lens holding member 3 and the intermediate holding member 6 can be separated safely.

VARIATION 3 OF EXAMPLE

Figure 6:
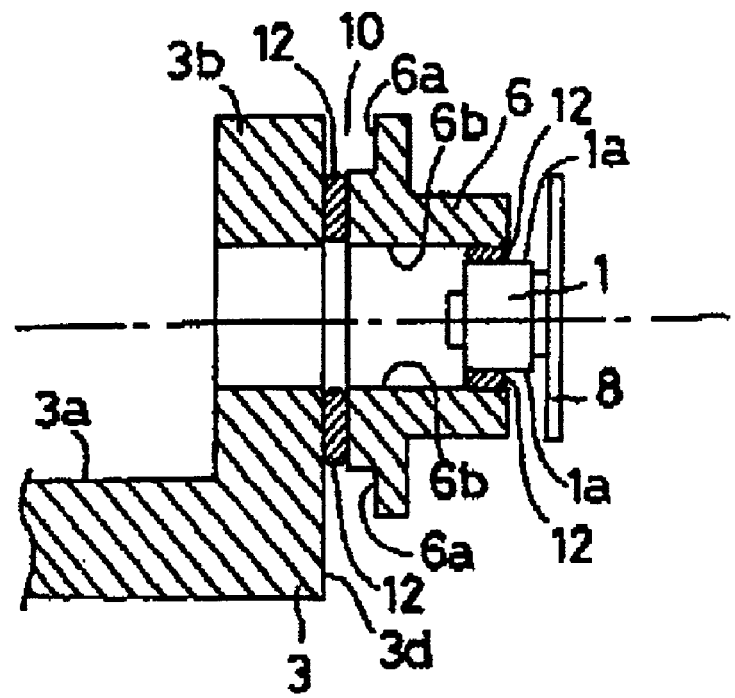
FIG. 6 is a partial cross sectional view of an image data input unit having a fixing structure according to a third variation of the example of present invention, which is cut vertically and looking from one of its side.

For other variation, the projecting portion may be formed on bottom surface 6*a*, as a contacting surface for the intermediate holding member 6 in order to form the space 10, as FIG. 6 the partial cross sectional view looking from its side direction is shown. In this case because there is no need to form the projecting portion on the image focusing lens holding member 3, and the shape of it can be made simple, a cost saving is attained.

Of course it is possible that the projecting portion are formed on both of the contacting surface 3*d* of image focusing lens holding member 3 and the bottom surface 6*a* of intermediate holding member 6 as a facing surface. By this arrangement it enables easy to make the space 10 larger, the tool 11 which is not shown in drawings can be easily inserted.

VARIATION 4 OF EXAMPLE

Figure 7:
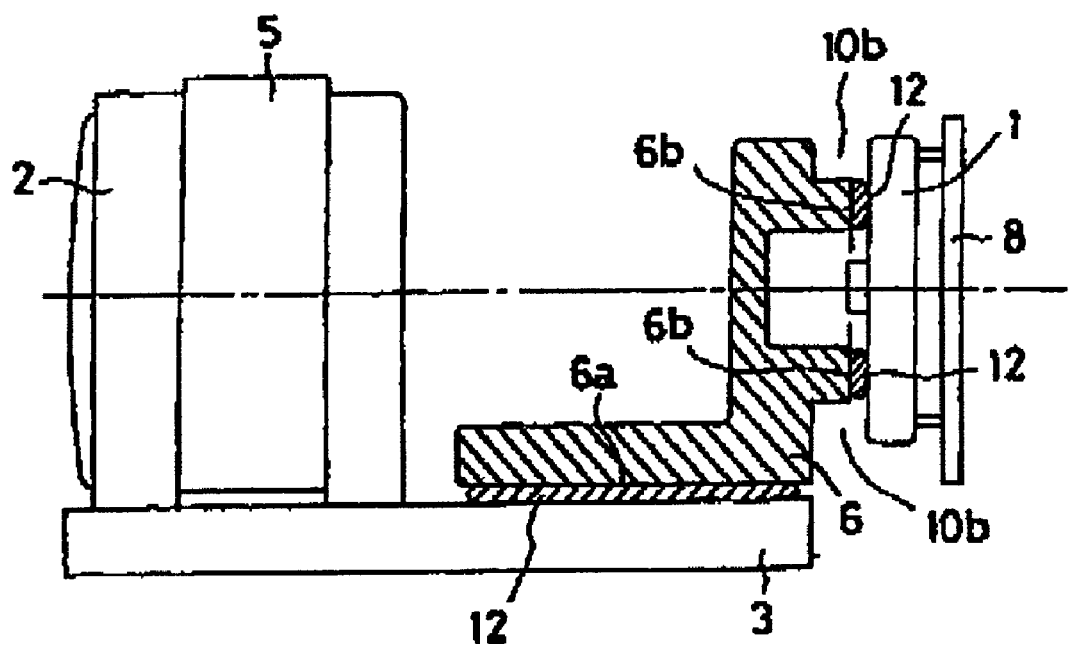
FIG. 7 is a partial cross sectional view of an image data input unit having a fixing structure according to a fourth variation of the example of present invention looking from one of its side.
Figure 8A:
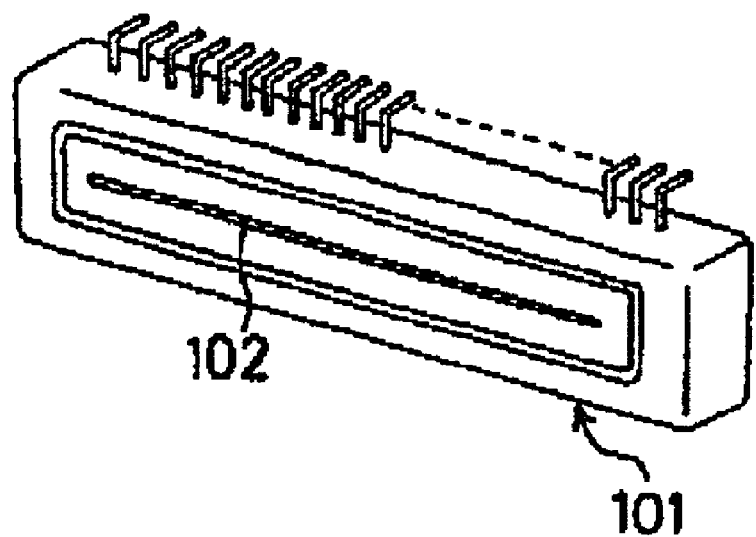
FIG. 8(a) is a perspective view to show a solid state image forming device which has single line of pixel.
Figure 8B:
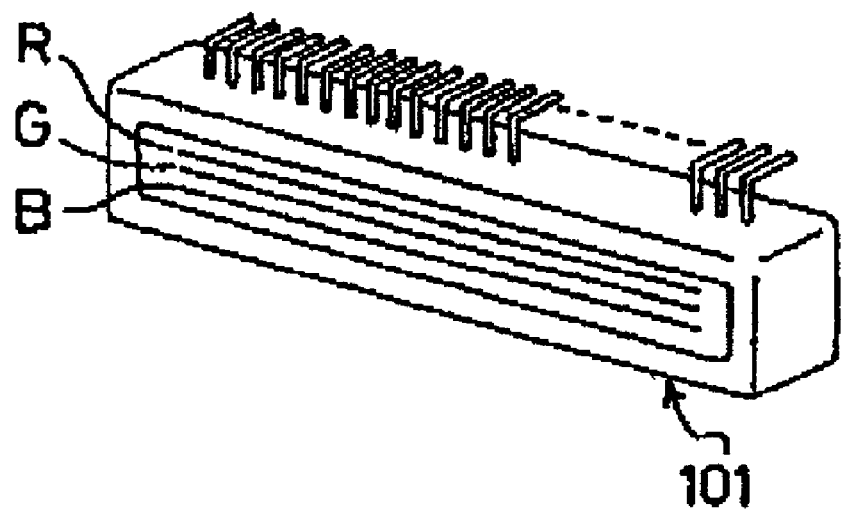
FIG. 8(b) is a perspective view of the solid state image forming device for image data input of colored images.
Figure 9:
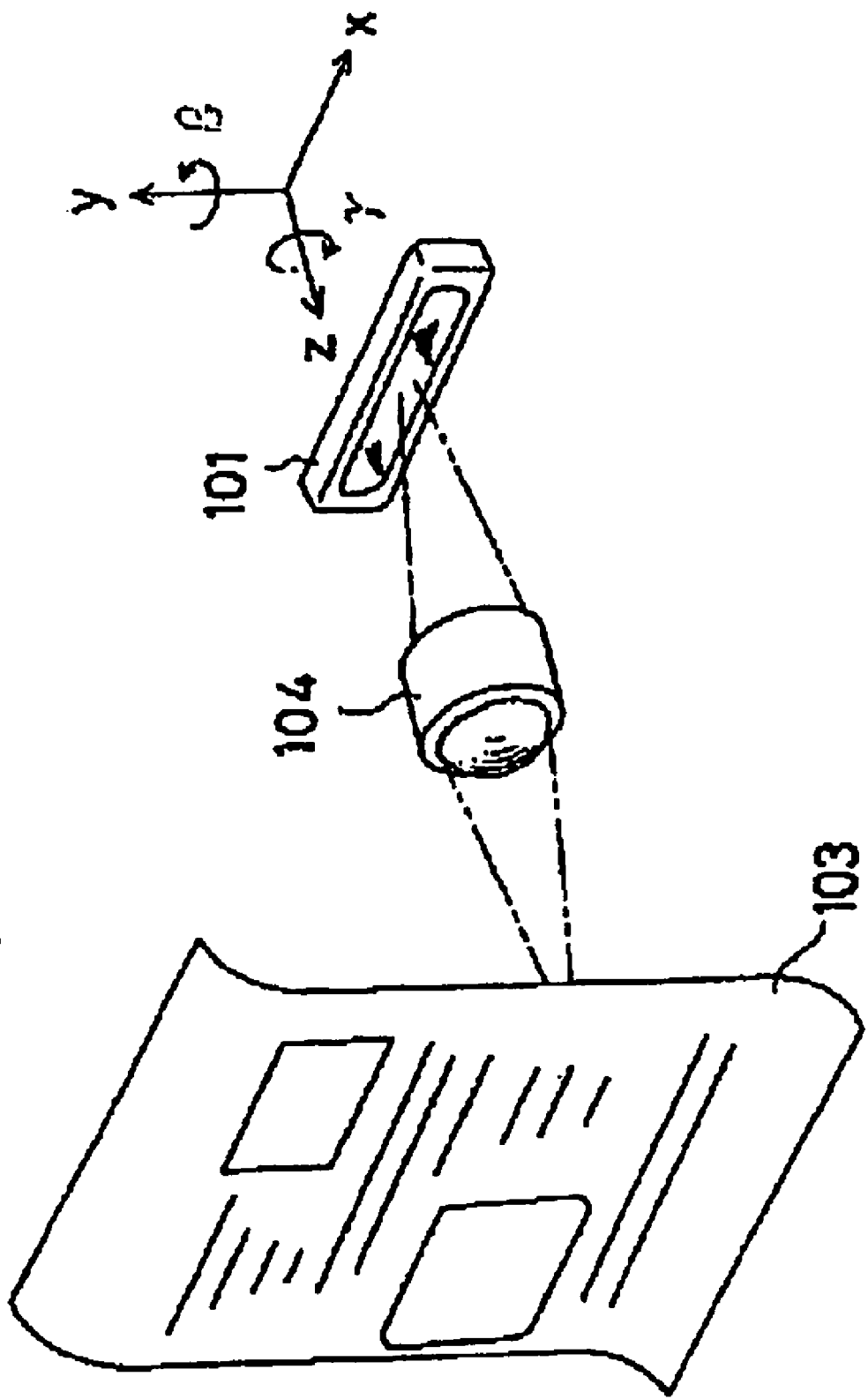
FIG. 9 is a perspective view to show a rough sketch of arrangement for image data input portion of the image data input apparatus.
Figure 10:
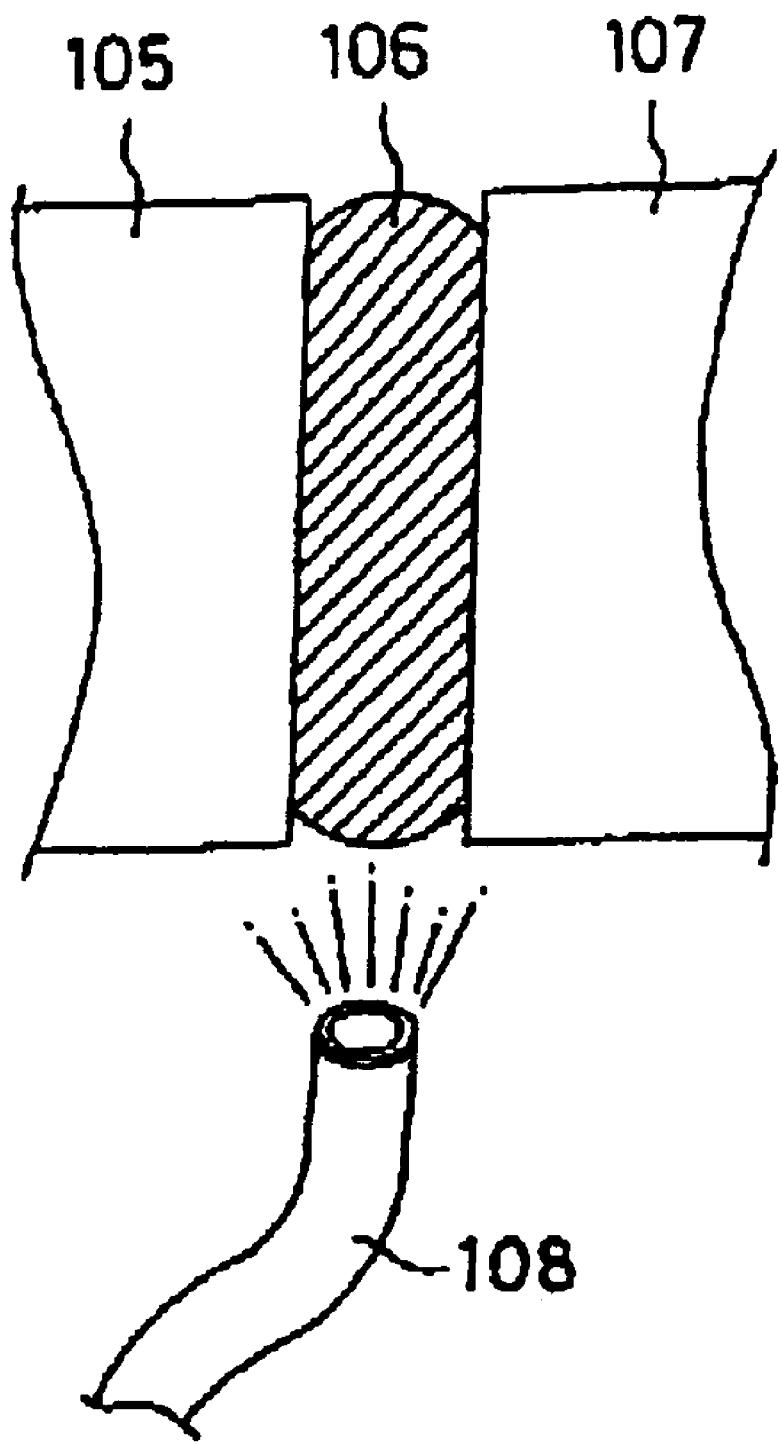
FIG. 10 is a rough sketch to show an adhered portion which is adhered by utilizing ultraviolet setting adhesive material.
Figure 11:
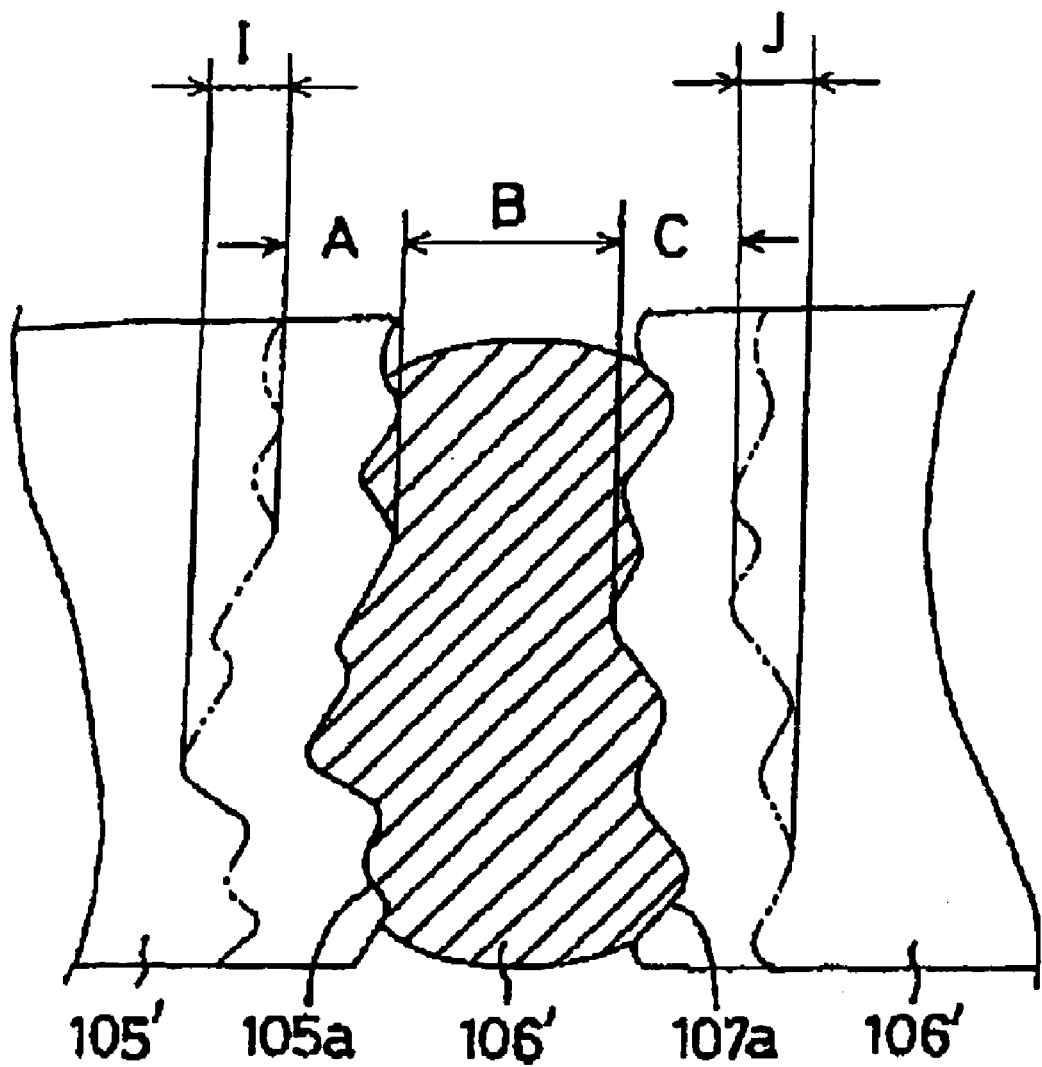
FIG. 11 is a rough sketch to explain an adhering structure by the caulking adhering method.

A partial cross sectional view of a fixing structure for the solid state image forming device according to the fourth variation of example of the present invention looking from its side direction is shown in FIG. 7. In this variation the image focusing lens holding member 3 is made in a flat plate shape and the intermediate holding member 6 is made in an L shaped. Because the intermediate holding member 6 is made of light transparent material the light beam from the image focusing lens 2 can arrive at the pixel lines of solid state image forming device 1. For other variation an arrangement may be possible that instead of making of light transparent material, a light beam passing window can be made to pass the light beam from the image focusing lens 2.

In this variation 4 of example because the adhering surface 5 between the image focusing lens holding member 3 and the intermediate holding member 6 is parallel to x-z plane, and the adhering surface between the intermediate holding member 6 and the solid state image forming device 1 is parallel to x-y plane, because the image focusing lens holding member 3 and the solid state image forming device 1 can have the positional adjustment in direction of the five axes of x, y, z, β and γ, the accurate positional distribution can be attained as the above described examples of the present invention.

In this fourth variation of example the projecting portions are made at the positions that are apart in predetermined distances inside from the four corners of the adhering surface 6*b* of the intermediate holding member 6, and they are adhered onto the solid state image forming device 1 by the caulking adhering method and a space 10*b* is formed in the surrounding portion of it. When the image focusing lens holding member 3 and the solid state image forming device 1 are separated, by inserting into this space 10*b* a separating means (not shown) whose width of top portion is narrower than the width of space 10*b*, and turning, only the solid state image forming device 1 can be easily separated. By this arrangement even when the intermediate holding member 6 has a defect, only the solid state image forming device 1 can be easily separated from the intermediate holding member 6.

As described above, utilizing the fixing structure for the solid state image forming device, the image data input unit and the image data input apparatus including the image data input unit according to the present invention, cost saving, yield of production, resource saving and contribution for protection of environment can be realized because the solid state image forming device can be easily separated from the image focusing lens and only the image focusing lens holding member can be scrapped solely when the image focusing lens holding member has defect and the solid state image forming device and the circuit board must not be scrapped, while high accuracy of positioning can be easily and inexpensively attained with simple structure of the caulking adhering method.

What is claimed is:

1. A fixing structure comprising:
an image focusing lens holding member comprising a surface;
an intermediate holding member configured to hold a solid state image forming device onto the image focusing lens holding member, the intermediate holding member comprising a surface facing the surface of the image focusing lens holding member; and
at least one projecting portion formed on one of the surfaces of the image focusing lens holding member and the intermediate holding member, the at least one projection portion comprising a surface contacting through an adhesive material the other one of the surfaces of the intermediate holding member and the image focusing lens holding member,
wherein a space configured to receive a tool inserted therein, is formed between the intermediate holding member and the image focusing lens holding member, wherein said intermediate holding member and said image focusing lens holding member which are fixed by the adhesive material are separated by the tool.

2. The fixing structure according to claim 1, wherein the image focusing lens holding member comprises an image focusing lens holding board portion configured to hold the image focusing lens, and a standing board portion standing from the image focusing lens holding board portion and configured to hold the solid state image forming device through said intermediate holding member, and the standing board portion comprising a light beam passing window configured to pass a light beam from said image focusing lens.

3. The fixing structure according to claim 2, wherein at least three of said projecting portions are arranged at positions apart predetermined distances inside four corners of the surface of said image focusing lens holding member.

4. The fixing structure according to claim 2, wherein the space is configured to receive the tool such that the tool contacts the surface of the projecting portion from a vertical and a horizontal direction.

5. The fixing structure according to claim 3, wherein the space is configured to receive the tool such that the tool contacts the surface of the projecting portion from a vertical and a horizontal direction.

6. An image data input unit comprising:
an image focusing lens holding member configured to hold an image focusing lens, the image focusing lens holding member comprising a surface;
an intermediate holding member configured to hold a solid state image forming device onto the image focusing lens holding member, the intermediate holding member comprising a surface facing the surface of the image focusing lens holding member; and
at least one projecting portion formed on one of the surfaces of the image focusing lens holding member and the intermediate holding member, the at least one projection portion comprising a surface contacting through an adhesive material the other one of the surfaces of the intermediate holding member and the image focusing lens holding member,
wherein a space configured to receive a tool inserted therein, is formed between the intermediate holding member and the image focusing lens holding member, wherein said intermediate holding member and said image focusing lens holding member which are fixed by the adhesive material are separated by the tool.

7. An image data input apparatus including an image data input unit comprising:
an image focusing lens holding member configured to hold an image focusing lens, the image focusing lens holding member comprising a surface;
an intermediate holding member configured to hold a solid state image forming device onto the image focusing lens holding member, the intermediate holding member comprising a surface facing the surface of the image focusing lens holding member; and
at least one projecting portion formed on one of the surfaces of the image focusing lens holding member and the intermediate holding member, the at least one projection portion comprising a surface contacting through an adhesive material the other one of the surfaces of the intermediate holding member and the image focusing lens holding member,
wherein a space configured to receive a tool inserted therein, is formed between the intermediate holding member and the image focusing lens holding member, wherein said intermediate holding member and said image focusing lens holding member which are fixed by the adhesive material are separated by the tool.

8. A fixing structure comprising:
a lens holding member configured to hold a lens;
an intermediate holding member configured to hold an image forming device onto the lens holding member;
at least one projection formed on a surface of one of the lens holding member and the intermediate holding member, the projection configured to contact a surface of the other one of the intermediate holding member and the lens holding member; and
a tool receiving space disposed between the lens and intermediate holding members to separate the lens holding member and intermediate holding member.

9. The fixing structure according to claim 8, further comprising:
an adhesive disposed between the projection and the surface of the other one of the intermediate holding member and the lens holding member.

10. The fixing structure according to claim 8, wherein the at least one projection comprises a plurality of projections.

11. The fixing structure according to claim 10, wherein the plurality of projections comprises at least three projections.

12. The fixing structure according to claim 8, further comprising:
a solid state imaging device disposed in the intermediate holding member.

13. The fixing structure according to claim 8, further comprising:
a focusing lens disposed in the lens holding member.

14. The fixing structure according to claim 13, further comprising:
a solid state imaging device disposed in the intermediate holding member.

15. The lens fixing structure according to claim 14, further comprising:
an adhesive disposed between the projection and the surface of the other one of the intermediate holding member and the lens holding member.

* * * * *